Figure 1:
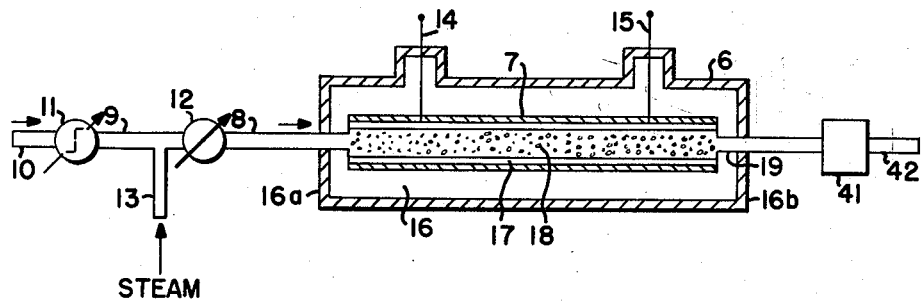

Sept. 1, 1964

C. E. JAHNIG 3,147,080

PROCESS FOR PREPARING HYDROGEN BY STEAM
REFORMING OF HYDROCARBONS
Filed July 10, 1961

Charles E. Jahnig    Inventor

By *George J. Hickey*

Patent Attorney

United States Patent Office 3,147,080
Patented Sept. 1, 1964

3,147,080
PROCESS FOR PREPARING HYDROGEN BY STEAM REFORMING OF HYDROCARBONS
Charles E. Jahnig, Rumson, N.J., assignor to Esso Research and Engineering Company, a corporation of Delaware
Filed July 10, 1961, Ser. No. 122,730
10 Claims. (Cl. 23—212)

This invention relates to the preparation of high purity hydrogen under superatmospheric pressure by the steam reforming process. More specifically, the invention relates to the use of electric resistance heating in the steam reforming of hydrocarbons to produce a gas rich in hydrogen under high superatmospheric pressure in a practical apparatus.

In the production of hydrogen by the steam reformation of hydrocarbons, it is well known to carry out the process in two stages at a relatively low superatmospheric pressure, and then compress the product hydrogen to higher pressure. In the first stage, methane and/or other hydrocarbons are reacted with an excess of steam at a temperature which is usually above about 1200° F. A reforming catalyst, such as nickel-magnesia, is employed and the products of this reaction are mainly $H_2$, CO, and $CO_2$. Since a high temperature is required to promote the reformation reaction, a relatively high proportion of CO to $CO_2$ remains in the product gases.

In order to increase the yield of hydrogen, the product gases are then passed to a second stage reaction zone which is operated at a lower temperature than the first stage. Additional steam is generally added to this second stage and a catalyst such as $Fe_2O_3$, is employed. The excess CO then reacts with the steam according to the water gas shift reaction and $CO_2$ along with additional $H_2$ is produced. Since carbon monoxide conversion is limited by water-gas shift equilibrium considerations, complete conversion of CO to $CO_2$ is not realized; however, only a very small proportion of the CO remains unoxidized. The hydrogen is then separated from the mixture of gases coming from the shift converter by methods well known in the art.

It is desirable in the production of hydrogen by the steam reforming or reformation method to operate the process at a high superatmospheric pressure so that compression of product hydrogen is avoided, i.e., the expense of compressing the hydrogen after it is produced is eliminated. However, when the pressure in the reaction zone is raised, the equilibrium of the reaction shifts so that a much lower percentage of $H_2$ is produced. This may be overcome by raising the temperature in the heating chamber. However, when a large amount of heat is put through the walls of the furnace tubes at high temperature in the conventional heating chamber, these tubes cannot withstand the high pressures at the high temperature desired in the steam reforming process.

In this invention it is proposed that heat be generated inside the furnace tubes by electrical resistance heating so that the tubes will not be weakened by the heating and can withstand relatively high superatmospheric pressures. Thus it is possible to generate or produce high purity hydrogen at an unusually high superatmospheric pressure. This electrical resistance heating is necessary only in the first stage of the steam reformation reaction since the second or shift conversion stage operates at a much lower temperature (about 800° F.), and the reaction is exothermic.

The data below are presented to indicate the relationship of temperature and pressure to the equlibrium of the steam reformation reaction. The top heading indicates the temperature inside the reaction zone and the heading at the side indicates the pressure in said reaction zone. The percentage figures indicate the purity of the hydrogen produced at equilibrium under those conditions. These percentages assume 100% conversion of CO in the subsequent shift conversion reactor, and essentially complete removal of $CO_2$ and $H_2O$. A feed of steam/$CH_4$ in a ratio of 3/1 is utilized.

| | 1,300° F. | 1,400° F. | 1,500° F. | 1,600° F. |
|---|---|---|---|---|
| 150 p.s.i.g.----------percent-- | 85.7 | 93.2 | 96.8 | 98.5 |
| 400 p.s.i.g.--------------do--- | 74.0 | 83.0 | 90.5 | 95.0 |

Thus it may be seen that under conventional conditions of steam reforming with a temperature of about 1400° F. and a pressure of about 150 p.s.i.g., it is possible to obtain $H_2$ at a purity of about 93.2%. However, if the pressure is raised to about 400 p.s.i.g., then a purity percentage of only about 83.0% is possible. To regain the same purity of about 93.2% at 400 p.s.i.g. would require a temperature of about 1550° F. Such a temperature is impractical since if the reaction tube or tubes are heated to this temperature in a conventionally fired furnace, they are weakened and cannot withstand a pressure of 400 p.s.i.g. The present invention makes feasible and practical the use of such high temperatures and pressures in combination.

It is an object of this invention to produce a gas rich in $H_2$ by steam reforming hydrocarbons at a high temperature and pressure.

It is another object of this invention to carry out the reaction in a reaction tube or tubes without danger of weakening them.

A further object of this invention is to produce a gas rich in hydrogen at high superatmospheric pressure to save on the cost of compression of the product hydrogen.

Figure 2:
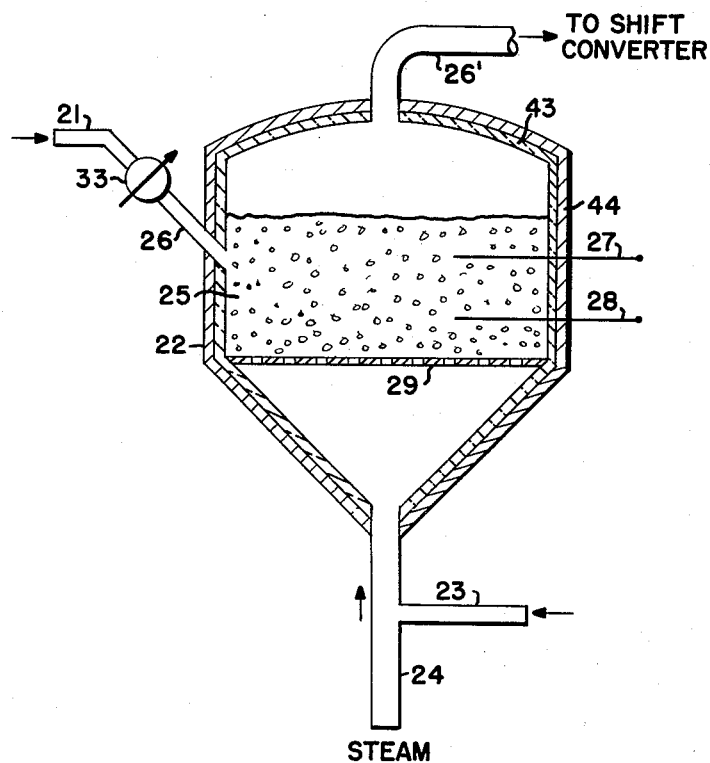

Other objects and advantages of the invention will become apparent during the course of the following discussion and description of the accompanying drawings in which:

FIGURE 1 represents an embodiment wherein a gaseous or vaporized hydrocarbon feed flows through a reactor tube filled with catalyst; and FIGURE 2 represents another embodiment in which atomized or finely-divided carbonaceous matter is heated in a fluid bed system.

Referring now to FIGURE 1, the hydrocarbon feed, such as methane, naphtha vapor or other gaseous or vaporized hydrocarbon, is fed into inlet line 10 and compressed by being passed through compressor 11. In the case of natural gas feed, the compressed gaseous hydrocarbon leaves the compressor through line 9 at a pressure between about 100 and 500 p.s.i.g. and a rate of between about 1000 and 6000 s.c.f.h. (standard cubic feet per hour), for example, about 1900 s.c.f.h. The feed is mixed with a steam in line 9 passing in through inlet line 13, said steam flowing at the rate of between about 3 and 6 mols per mol of methane feed, and preferably passes to preheater 12. There the feed is heated to a temperature of between about 800° and 1400° F., preferably between about 900° and 1100° F., after which it passes into line 8. Normally the steam and hydrocarbon feed will both be preheated, either separately or in mixture, before going to the electric reforming furnace. The preheating can be by exchange with hot products, or in a separately fired furnace. In the latter case, partial reforming can be carried out in a conventional manner ahead of the electric reformer so as to reduce power consumption.

The mixture of gaseous or vaporized hydrocarbon and steam passes into reactor tube 7 which may be between about 10 and 60 feet long, preferably between about 20 and 40 feet, and has an interior diameter of between about 2 and 12 inches, preferably between about 4 and 8 inches.

Multiple tubes in parallel are usually to increase plant throughput.

Electrical resistance tubular heating element 17 lines the interior of reactor tube 7. This element may be made of any kind of electrically resistant material, although in this embodiment it comprises a high resistance alloy tube (e.g. Nichrome) concentrically set within the reactor tube. Other materials such as silicon carbide may be used. Elecrically resistant heating element 17 has an ohmic resistance between about 50 and 500 microohms per cm. cubed. Heating element 17 is filled with particles of a conventional reforming catalyst such as nickel-magnesia, although particles of a conductive material such as metal particles or carbon granules may be admixed with this to provide a more dispersed heating area and/or to conduct electrcity. In this example a majority of the catalyst particles were in the range of ⅛" to ½" in diameter. In the embodiment represented, the tubular heating element (6" dia. x 40 ft. long) is filled with about 300 to 500 pounds of catalyst. Electric current of about 30 to 1000 volts, preferably 200 to 400 volts, passes through leads 14 and 15, which are pressure sealed, into heating element 17 to provide a temperature within the tube of between about 1400° and 1900° F., preferably about 1600° F.

Reactor tube 7 is enclosed by tubular surrounding insulating shell or wall 16 to reinforce and strengthen tube 7 and to give electric and thermal insulation, and so that it will readily resist and withstand the interior pressure which is between about 100 and 1500 p.s.i.g., preferably between about 200 to 500 p.s.i.g. Insulating wall 16 in this example is composed of high purity alumina, although any suitable insulating material may be used, and is enclosed by metal pressure shell 6 which may be kept at a low temperature. Shell 16 has reduced ends 16a and 16b. End 16a is shown as integral with line 8, but will preferably be made separate and coupled to line 8 so that it will be pressure tight. The gaseous mixture passes through reactor tube 7 at a pressure of about 100 to 1500 p.s.i.g. and the gas residence time within tube 7 is between about 2 and 20 seconds based on outlet gas volume. $H_2$ CO and $CO_2$ are produced in the reactor tube and these products, along with unreformed steam and gaseous hydrocarbons, pass out of outlet line 19 and then pass to the shift converter reactor diagrammatically shown at 41 which may be of conventional design wherein the temperature is about 800° F. and the pressure is about 100 to 250 p.s.i., and wherein carbon monoxide and steam react to form carbon dioxide and more hydrogen. Outlet line 42 leads the product gas to storage tanks or conventional purifying facilities where the residual CO, $CO_2$ and $CH_4$ may be separated from the hydrogen.

At temperatures and pressures as given in the above example, about 10,000 s.c.f.h. of a gas are obtained leaving furnace 7 containing from 60 to 80% hydrogen, 10 to 20% carbon monoxide and 10 to 20% of steam, and less than 1 to 5% hydrocarbons; soot formation is negligible. If desired, more steam can be used to minimize residual hydrocarbons. After shift conversion, a hydrogen percentage of about 95% may be obtained.

Electrical resistance heating in an apparatus similar to that of FIGURE 1 may also be used to effect the thermal decomposition of hydrocarbon gases. No catalyst or steam would be used in such a process, but the tube could be filled with inert particles such as carbon pellets to provide more surface for heat transfer and/or to conduct electricity.

It is possible to utilize a similar apparatus to calcine or desulfurize coke. The use of the electrically heated element would eliminate the problem of variable resistance which occurs when the heat for calcining coke is provided by passing electrical current through the coke itself. In this case the coke can be fluidized or larger lumps and/or fine coke can be passed through the tube. Product goes to a soaker, cooler, etc. as is common practice. The recovered gases are often a valuable high purity hydrogen byproduct.

In the embodiment shown in FIGURE 2, the feed, which may comprise atomized or crushed carbonaceous materials such as fuel oil or coke particles, and entraining gas, methane, naphtha, or other hydrocarbons, enters inlet line 21. In this specific example, fuel oil or naphtha is utilized as the feed. The feed preferably passes into preheater 33 where it is heated to a temperature of about 600° to 1200° F., preferably between about 800° and 1000° F. It then passes through line 26 into reactor 22 which is maintained at a pressure between about 100 and 1000 p.s.i.g. and which is partly filled with particles of a conventional reforming catalyst such as nickel-magnesia. In this example a majority of the catalyst particles were smaller than 100 mesh. Steam enters the bottom of this reactor through inlet line 24. The steam may be mixed with $CH_4$ or other gas coming through line 23. These gases pass up into the reactor across distributing grid 29 at a fluidizing pressure of about 100 to 1000 lbs., p.s.i.g., preferably between 200 and 600 p.s.i.g. With a fuel oil feed of about 11,000 lbs. per hour and a steam feed of about 15,000 to 20,000 lbs. per hour, about 900,000 cubic feet per hour of a gas are obtained containing from 60 to 80% hydrogen and 20 to 40% carbon monoxide, and less than 5% of hydrocarbons. Electric current of between about 30 and 1000 volts, preferably 200 to 400 volts, passes through leads 27 and 28 into fluidized bed 25, creating heat as a result of the resistance of the fluidized particles of reforming catalyst. Since the reforming catalyst is usually not conductive enough, particles of coke or metal can be added to help carry the current. In the case of coke, some will be consumed by reaction and makeup can be added as required. Also, current can be carried by resistance rods, lining or packing, etc.

This system makes it practical to steam reform liquid hydrocarbons, which feeds cannot be handled in conventional steam reformers. If desired, some carbon or coke can be withdrawn as product.

The reactor vessel is between about 10 and 20 feet in diameter, preferably between about 12 and 16 feet, and is between about 30 and 80 feet high. It is enclosed by insulating wall 43 which is, in turn, enclosed by metal pressure shell 44. The fluidized bed, which preferably extends above the level of inlet 26, has a total volume of between about 1,000 and 10,000 ft.$^3$, preferably between about 2,000 and 6,000 ft.$^3$. As a result of said voltage being passed into the fluidized bed, the temperature within the reactor is raised to a level of between about 1400° and 3000° F., preferably between about 1800° and 2400° F. Gaseous products which contain steam, CO, $CO_2$ and $H_2$ pass out through the top of reactor 22 through line 26' and then to a conventional shift converter, as in FIGURE 1, where much of the CO is further converted to $CO_2$ and more $H_2$ is produced.

Instead of a fluid bed, it is also possible to use a moving bed system to steam reform solid hydrocarbons, in which case heat can be exchanged between feed and products in the conventional manner.

The diagrammatic showing of FIGURES 1 and 2 omits many features which those skilled in the art would recognize as desirable or essential in plant operation. These omissions are made in order to simplify the presentation of the invention and to avoid encumbering it with wellunderstood engineering details. Thus, for example, catalyst conveying systems, flow control, engineering details of electrodes and electrical system, safety equipment, etc. are omitted from the diagrammatic representation.

This invention has been described in connection with certain specific embodiments thereof. However, it should be understood that these are by way of example rather than by way of limitation, and thus it is not intended that the invention be restricted thereby but only by the scope of the appended claims.

What is claimed is:

1. In a process wherein a high purity hydrogen stream is obtained by contacting a hydrocarbon and steam mixture with a steam reforming catalyst at a temperature sufficient to cause substantially complete reaction, the improvement which comprises contacting said hydrocarbon-steam mixture at a pressure in the range of from about 100 to 1500 p.s.i.g. and a temperature in the range of from about 1400° to 3000° F. in a reaction zone containing a steam reforming catalyst, said temperature being maintained by applying an electrical voltage to electrical resistance contained in said reaction zone.

2. The process of claim 1 wherein the hydrocarbon-steam mixture is preheated to a temperature in the range of from about 800° to 1400° F. prior to conducting said mixture to the reaction zone.

3. The process of claim 1 wherein the catalyst containing reaction zone is maintained at a pressure in the range of from about 200 to 500 p.s.i.g. and a temperature in the range from about 1400° to 1900° F.

4. The process of claim 1 wherein the reactants are preheated to a temperature in the range of from about 900° to 1100° F.

5. The process of claim 3 wherein the reactants are preheated to a temperature in the range of from about 900° to 1100° F.

6. A process according to claim 1 wherein said reaction zone comprises a fluidized bed of steam reforming catalyst solids.

7. A process for producing a high purity, high-pressure hydrogen stream from hydrocarbons which comprises preheating said hydrocarbon feed to a temperature in the range of from about 600° to 1200° F., transferring said preheated hydrocarbon feed to a reaction zone containing a fluidized solids bed of steam reforming catalyst particles, applying an electric voltage across at least a portion of said fluidized solids in said reaction zone, said voltage being sufficient to maintain the reaction zone at a temperature in the range of from about 1400° to 3000° F. due to the electrical resistance of the solid particles to the flow of electricity, upwardly introducing steam into the reaction zone at a fluidizing pressure of from about 100 to 1000 p.s.i.g., said steam contacting the hydrocarbon feed in the reaction zone at a pressure between about 100 and 1000 p.s.i.g. and a temperature in the range from about 1400° to 3000° F. to produce a gas rich in free hydrogen.

8. The process of claim 7 wherein the reaction zone is maintained at a temperature in the range of from about 1800° to 2400° F.

9. The process of claim 8 wherein the reaction zone is maintained at a pressure in the range of from about 200 to 600 p.s.i.g.

10. The process of claim 9 wherein the hydrocarbon feed is a liquid.

References Cited in the file of this patent
UNITED STATES PATENTS

| | | |
|---|---|---|
| 1,352,086 | Rose | Sept. 7, 1920 |
| 1,857,799 | Winkler | May 10, 1932 |
| 1,953,047 | Wilson | Mar. 27, 1934 |
| 1,960,886 | Woodhouse | May 29, 1934 |
| 1,960,912 | Larson | May 29, 1934 |
| 2,491,518 | Riblett | Dec. 20, 1949 |
| 2,628,890 | Shapleigh | Feb. 17, 1953 |
| 2,799,640 | Pevere et al. | July 16, 1957 |
| 2,982,622 | Jahnig et al. | May 2, 1961 |